Feb. 2, 1926.  H. J. WARNER  1,571,745
LATHE
Filed June 23, 1924   6 Sheets-Sheet 6

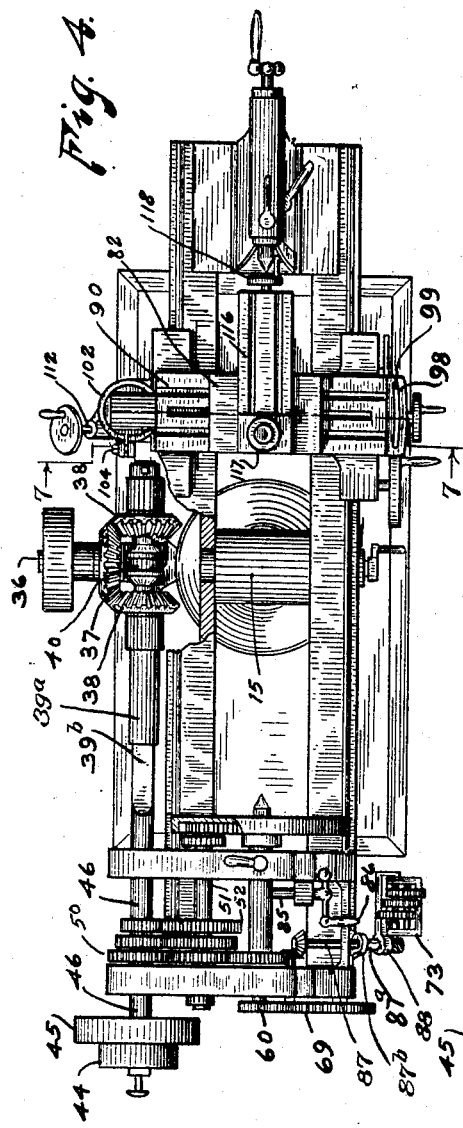
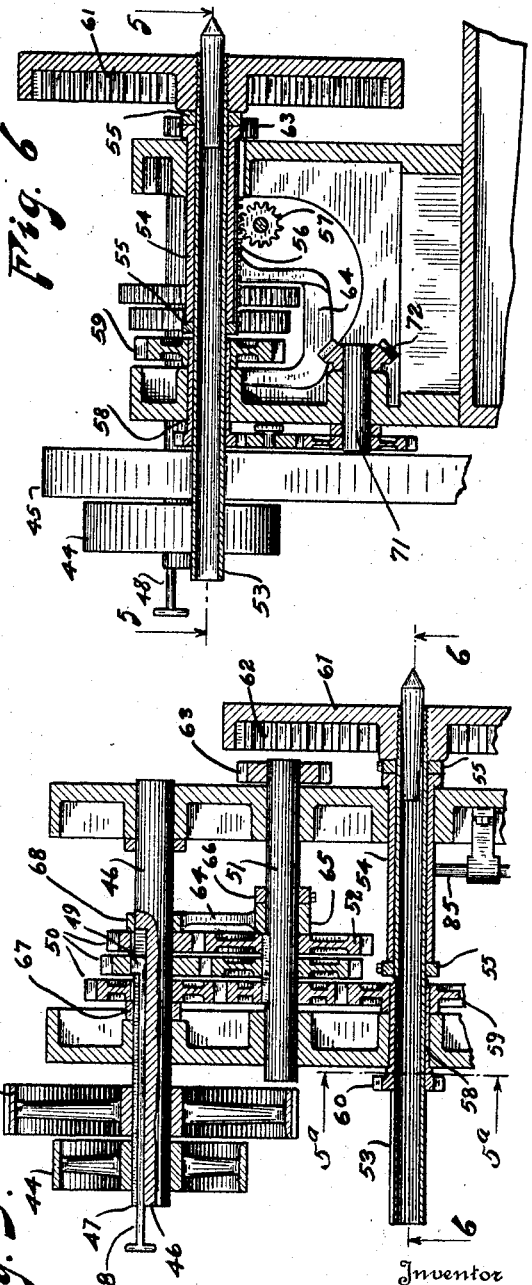

Inventor
Harvey J. Warner.
By A. J. O'Brien
Attorney

Patented Feb. 2, 1926.

1,571,745

UNITED STATES PATENT OFFICE.

HARVEY J. WARNER, OF DENVER, COLORADO, ASSIGNOR OF ONE-THIRD TO ALBERT S. CARTER AND ONE-THIRD TO W. J. CATTELL, BOTH OF DENVER, COLORADO.

LATHE.

Application filed June 23, 1924. Serial No. 721,753.

*To all whom it may concern:*

Be it known that I, HARVEY J. WARNER, a citizen of the United States, residing at Denver, county of Denver, and State of Colorado, have invented certain new and useful Improvements in Lathes; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in lathes of the type that can also be used as drill presses, milling machines, etc.

In many places and especially in automobile repair shops, it is necessary to be able to do almost any kind of machine work and at the same time the volume of business does not justify the owner to incur the expense of buying separate machines. For example, a shop should have a lathe, a drill press, and a milling machine or a machine that can be employed for each of these operations. Where separate machines are used, the total cost will be high and oftentimes prohibitive.

It is the object of this invention to produce a machine that can be employed for each of the purposes above referred to, and which, at the same time, can be sold at a price approximately the same as that charged for an ordinary lathe.

The successful operation of my machine is dependent on the combination universal cross and vertical feed working table which can be tilted 45 degrees either way and can be swung through a considerable angle from the normal right angle position.

My invention can be most clearly described and will be most readily understood when reference is had to the accompanying drawings in which the preferred form of my invention is illustrated, and in which:

Fig. 1 is a side elevation of my improved machine, showing the same as it appears when it is used as a lathe;

Fig. 1ª is a section taken on line 1ª—1ª, Fig. 1;

Fig. 4 is a top plan view of the lathe with parts broken away to better show the construction;

Fig. 5 is a horizontal section taken on line 5—5, Fig. 6;

Figure 7:
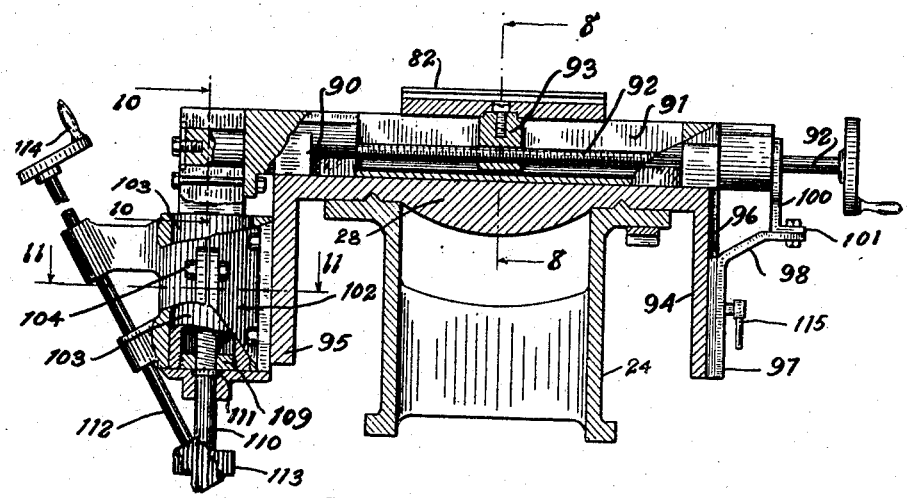
Figure 9:
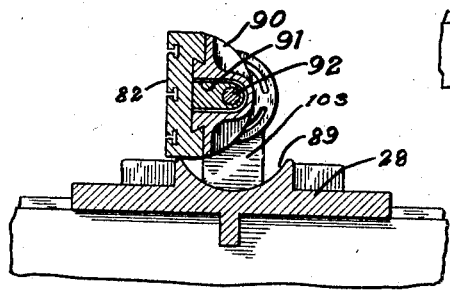
Figure 8:
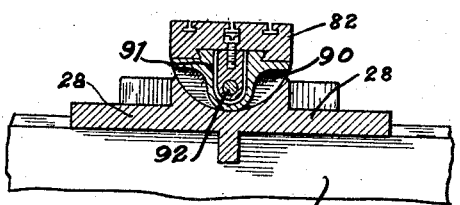
Figure 10:
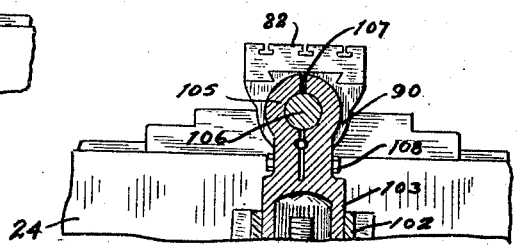
Figure 11:
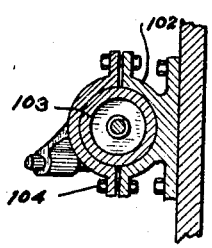
Figure 12:
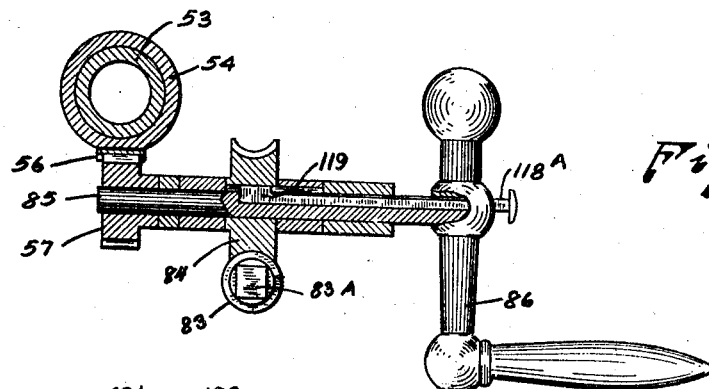
Figure 13:
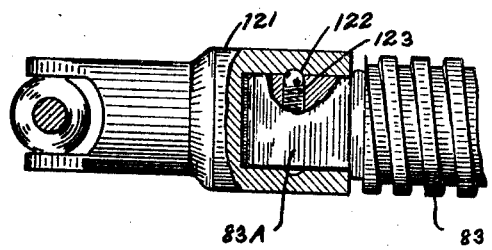

Fig. 5ᴬ is a section taken on line 5ᴬ—5ᴬ, Fig. 5;

Fig. 6 is a vertical section taken on line 6—6, Fig. 5;

Fig. 7 is a section taken on line 7—7, Figs. 4 and 8;

Fig. 8 is a section taken on line 8—8, Fig. 7;

Fig. 9 is a section similar to that shown in Fig. 8 and shows the cross-feed table raised and rotated through an angle of 90 degrees;

Fig. 10 is a section taken on line 10—10, Fig. 7;

Fig. 11 is a section taken on line 11—11, Fig. 7;

Fig. 12 is a detail showing the means for feeding the spindle;

Fig. 13 is a view showing a detail of construction; and

Figure 14:
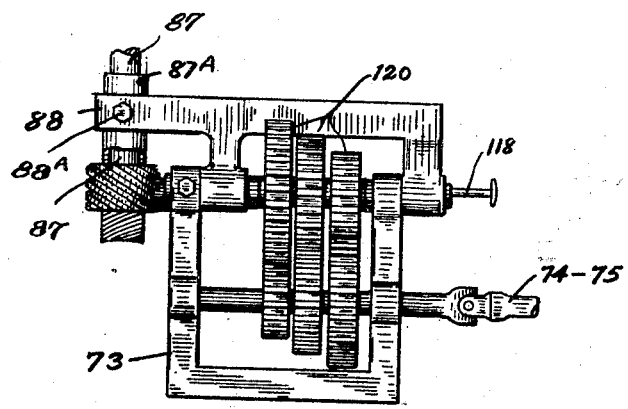

Fig. 14 is a view partly in section showing a gear-set.

Figure 1:
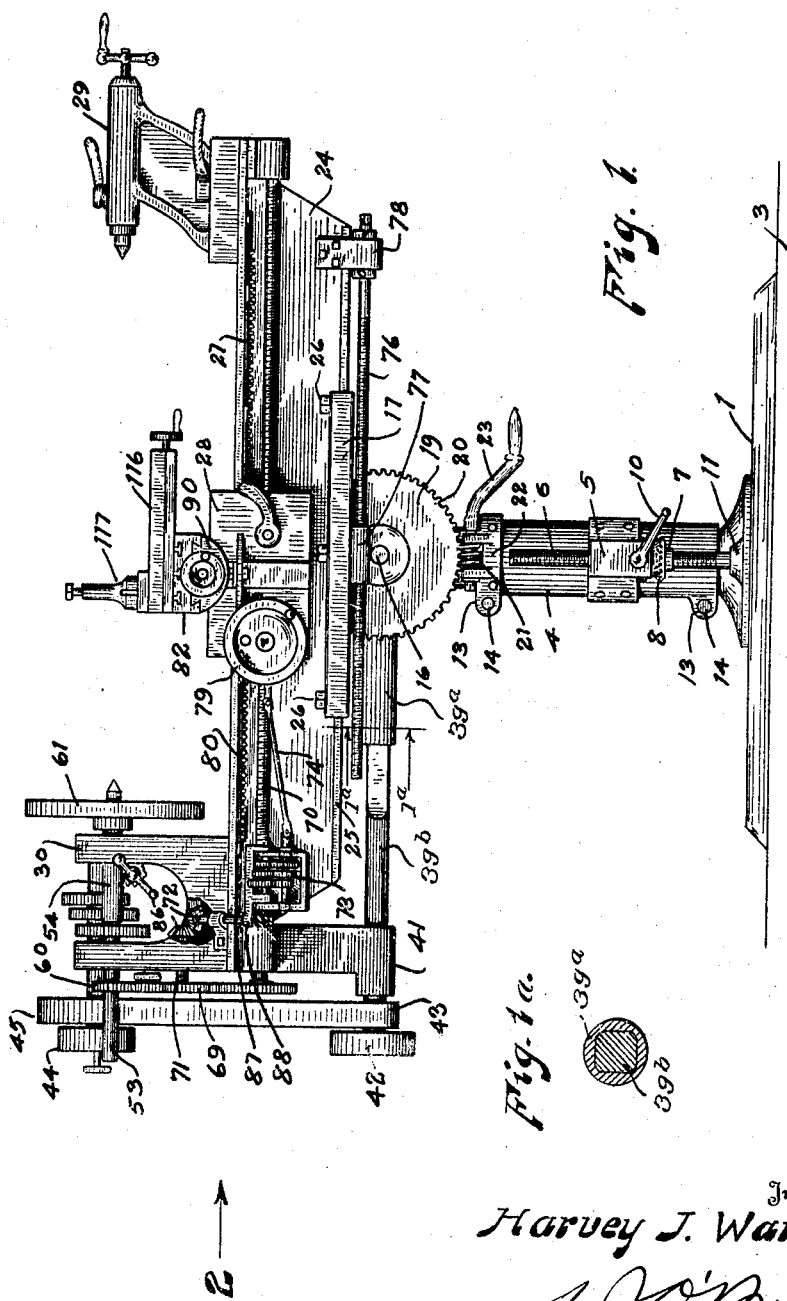
Figure 2:
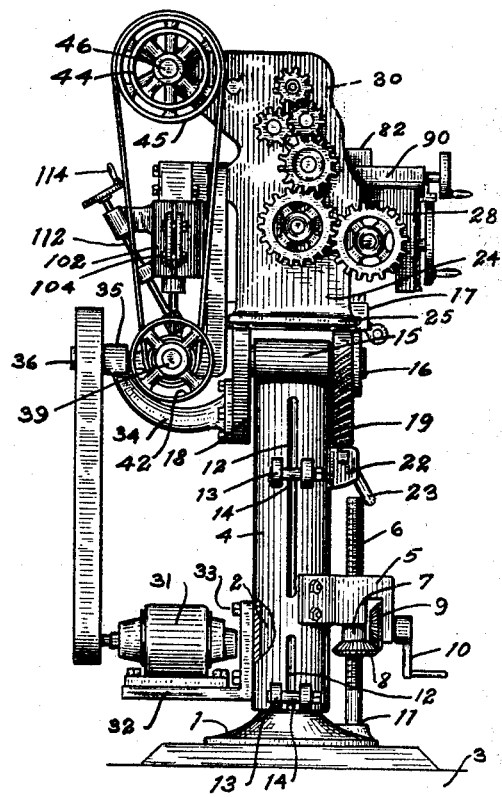
Fig. 2 is an end elevation looking in the direction of the arrow 2 in Fig. 1.

My machine is supported on a base 1, which is provided with a vertical post 2. The base is bolted or otherwise secured to a cement foundation 3. Mounted on the post 2 is a sleeve 4 whose inside is bored to the proper size to receive the post 2 with an easy sliding fit. A bracket 5 is secured to the sleeve 4 near the lower end thereof. This bracket is provided with an opening for the reception of the screw 6, which is threaded and has operatively associated therewith a nut 7 which has formed integral therewith a bevel gear 8. Another gear 9 is mounted so as to rotate about an axis perpendicular to that of the bolt 6 and is meshed with the gear 8 so that the latter can be rotated by means of the crank 10. The lower end of the screw 6 rests on the abutment 11 and serves to raise and to lower the sleeve 4, which is necessary at times, for reasons that will become apparent as the description proceeds. The sleeve 4 has slits 12 and is provided with two pairs of opposed ears 13, each pair of which cooperates with a bolt 14. When the sleeve 4 has been brought to the desired height, the bolts 14 are tightened, whereby the sleeve is clamped onto the post 2. The top of the sleeve has a transverse bearing 15 which receives the shaft 16 upon which the lathe bed supporting table 17 is mounted. This is provided with two downwardly extending flanges 18 and 19, the latter being provided with teeth 20 which cooperate with the worm 21, which is rotatably mounted in a bracket 22. A crank 23 is adapted to be attached to the worm and serves as the means by which it is rotated for the purpose of tilting the lathe bed support 17. The lathe bed 24 has opposed flanges 25 that fit into suitable grooves in the support 17 in such a way that it can be moved longitudinally with respect to the support. Bolts 26 serve to clamp the lathe bed in adjusted position. From the description so far given, it is evident that the lathe bed can be raised or lowered, moved back and forth on the support 17, and tilted about the pivot 16. The lathe bed is constructed, in the main, like an ordinary lathe bed and has outwardly extending flanges 27 which serve as a guide for the cross-feed table support 28, which will be hereinafter more fully described. A tailstock 29 and a headstock 30 are secured to the lathe bed in the usual manner. The machine derives its power from a motor 31, which is secured to a bracket 32, that in turn is fastened to the sleeve 4 by suitable means such as bolts 33. A bracket 34 extends outwardly from flange 18 and has its outer end 35 provided with a bearing for the reception of the shaft 36. The axis of shaft 36 coincides with the axis of the shaft 16 so that when the lathe is tilted the distance between the centers of the shaft of the motor and that of shaft 36 will not change. This makes it practicable to transmit power from the motor to the shaft 36 at any position of the lathe. A bevel gear 37 (Fig. 4) is secured to the inner end of shaft 36 and cooperates with similar gears 38, which are rotatably secured to the drive shaft 39, which is formed of two parts 39ª and 39ᵇ telescopically connected to each other as indicated in Fig. 1ᴬ. A clutch mechanism 40 enables either one of gears 38 to be connected to the shaft 39, whereby the direction of rotation of the latter can be changed at will. Shaft 39 has its outer end supported in the bearing 41 and is provided with pulleys 42 and 43, which are cooperatively related with pulleys 44 and 45, respectively, on the headstock drive shaft 46. Shaft 46 has a longitudinal groove 47 within which is mounted a sliding key 48, one end of which has an outwardly extending projection 49. A number of gears of different diameters and designated as a whole by numeral 50, are rotatably mounted on shaft 46 and may be separately locked against rotation by means of the rod 48 in a manner obvious from an inspection of Fig. 5. A counter-shaft 51 has non-rotatably attached thereto a number of gears 52 whose sizes are such that each one meshes with one of the gears 50. In this manner it is evident that the gear ratio between shafts 46 and 51 can be altered. A hollow spindle shaft 53 has one end rotatably mounted in a slidable tubular bearing 54, which is held against relative longitudinal movement with respect to the spindle shaft 53 by means of collars 55. Bearing 54 has gear teeth 56 cut into the bottom surface thereof. These are engaged by a pinion 57, which, when it is rotated, will cause the bearing 54 and the spindle shaft to move longitudinally. The other end of the spindle shaft is slidable in, but held from relative rotation with respect to the sleeve 58 as shown in Fig. 6ᴬ. A gear 59 is secured to the inner end of the sleeve 58 and a second gear 60 is secured to the outer end thereof. When the parts are in the position shown in Fig. 5, the intermediate gear of group 50 transmits motion to the intermediate gear of the group 52. The smallest gear of group 52 is in engagement with the gear 59; therefore, when shaft 46 is rotated, the spindle shaft 53 will be correspondingly rotated and this can be moved longitudinally by rotating the pinion 57 in the manner explained. When the machine is to be employed as a lathe, a face plate 61 is applied to the end of the spindle shaft. The face plate has an internal gear 62 which is designed to be engaged by the pinion 63 by means of which it is rotated. When the face plate is to be rotated, it is evident that the gear 59 must be disconnected from the cooperating gear of group 52. This is accomplished as follows:

The shaft 51, which carries the gear group 52 is moved towards the right (Fig. 5) until the pinion 63 engages the gear teeth 62. A yoke 64 (Figs. 5 and 6) has a portion 65 which surrounds shaft 51 and is located between the gears 52 and the collar 66. Arms 67 and 68 of the yoke embrace the gear group 50. When the shaft 51 is moved longitudinally the gear groups 50 and 52 are moved together so as to always remain in mesh. When the shaft 51 is moved to the right so as to cause the pinion 63 to mesh with gear 62, the smallest gear of the group 52 will be moved out of mesh with the gear 59. A train of gears 69 transmits motion from the gear 60 to the feed screw 70.

Figure 3:
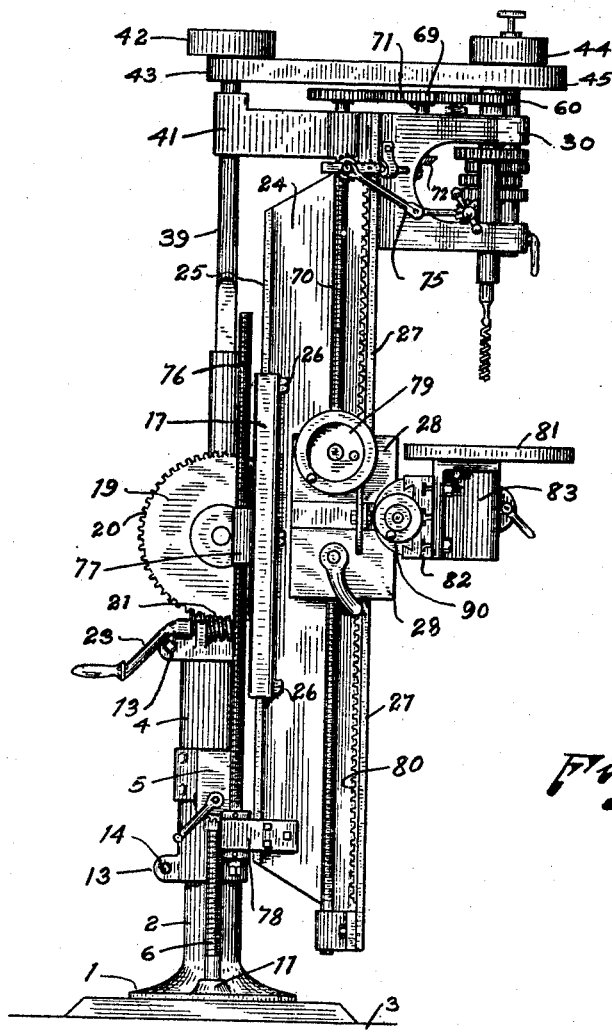
Fig. 3 is a view showing my machine as it appears when it is employed as a drill press.

For the purpose of operating the cross feed, I transmit motion from shaft 71 through the bevel gears 72 and gear set 73 to the jointed shaft 74. When the machine is used as a drill press (Fig. 3) a flexible shaft 75 may be employed to transmit motion to the pinion 57 (Fig. 6). A screw 76 has one end threadedly related to the nut 77 and rotatably connected to the bracket 78. When this screw is rotated, the lathe bed is moved on the support 17. A hand wheel 79 controls a pinion (not shown) which cooperates with the rack 80 and this constitutes the longitudinal hand feed. The carriage and cross feed table are provided with the usual means which cooperate with the screw 70 whereby the longitudinal feed will be automatically accomplished.

When the machine is to be employed as a lathe, it occupies the position shown in Fig. 1. If the machine is to be employed as a drill press or as a milling machine, it is moved to the position shown in Fig. 3. If it should be desirable for any reason to move the machine into such a position that the headstock shall be at the lower end, this may be readily accomplished by turning the crank 23 in the opposite direction. When the machine is to be employed as a drill press in the manner shown in Fig. 3, a table 81 in connected to the cross feed table 82 by some suitable means such as shown and indicated as a whole by numeral 83. When used as a drill press the face plate 61 is removed, the shaft 51 moved to the position shown in Fig. 5 so that the spindle shaft 53 may be rotated. When the drill is to be automatically advanced, the shaft 75 from the gear set 73 is extended to and connected with the worm 83 that cooperates with the worm gear 84 on the shaft 85. In ordinary cases the drill may be fed by hand, in which case the operator rotates shaft 85 through the medium of the crank 86. In order that the gearset 73 shall be adapted to rotate shaft 74, which drives the cross feed as well as shaft 75 which drives the drill feed, it is necessary that it shall be rotatable on the shaft 87. The shaft 87 has its lower end extending through the sleeve 87<sup>A</sup> whose upper end is clamped in the bracket 87<sup>B</sup> (Fig. 4). The gear set is provided with a bearing 88 through which the sleeve 87<sup>A</sup> extends and can be clamped to the latter by means of the set screw 88<sup>A</sup>.

In order to permit the machine to be converted into a milling machine or a grinder, it has been necessary to make several changes in the construction of the cross feed, as the machine must be so constructed that the table can be rotated through an angle of 90 degrees or more in order that it may be made to assume the position shown in Fig. 9. For this purpose I have provided the carriage 28 with an arcuate, transverse groove 89 for the reception of the arcuate member 90. This member has a central longitudinal slot 91 for the reception of the feed screw 92 which cooperates with and moves the table 82 through the medium of the nut 93 (Fig. 7). The carriage 28 has two downwardly extending aprons 94 and 95. The former has a dovetailed projection 96 which cooperates with a slide 97 whose upper end 98 is bent outwardly (Fig. 7) and is provided with an arcuate slot 99 (Fig. 4). A bracket 100 has an outwardly bent foot 101 which rests upon the portion having the slot. This bracket has an opening through which the saft 92 passes, and in which the shaft can rotate. Secured to the apron 95 is a cylindrical tubular bracket 102, within which is slidably mounted a cylindrical member 103 whose outside diameter is such that it fits snugly within the member 102, and which can therefore be clamped in adjusted position by means of the bolts 104. The upper end 105 of the cylindrical member 103 is provided with a transverse opening for the reception of the cylindrical part 106 which is an integral portion of the cross feed table 82. The part 105 has a cut 107 and can be clamped onto the portion 106 by means of the bolt 108. When the table 82 is to be raised, this is accomplished by moving the cylinder 103 upwardly and for this purpose I have provided the following means:

A nut 109 (Fig. 7) is secured to the lower end of the member 109 and is operatively related to the screw 110 whose outwardly extending shoulder 111 holds it against downward movement. By rotating the screw 110, the cylindrical member can be raised and lowered thereby raising the member 90 out of the groove 89 in the manner shown in Fig. 9. When the table 82 has been raised or lowered to the desired position, the bolts 104 are tightened whereby the part 103 is clamped. For convenience in rotating the screw 110, I have provided a shaft 112 which is operatively connected to the screw by means of spiral gears 113. This shaft has a crank 114, by means of which it can be rotated. When the table 82 is to be rotated into the position shown in Fig. 9 or to any intermediate position, it is first raised by the means above described. The clamping bolt 108 (Fig. 10) is then loosened, which permits the table to be rotated to the desired angle, after which the bolt 108 is tightened. The bracket 97 is provided with a clamping screw 115 (Fig. 7), by means of which it is locked in adjusted position. Secured to the cross feed table 82 is a smaller adjustable table 116, which carries the tool post 117, which is movable therealong and can be adjusted by means of the hand feed 118. The table 116 can be adjusted to any desired angular relation with respect to the cross feed table 82.

In Fig. 12 the worm wheel 84 is locked against rotation with respect to the shaft 85 by means of a slidable bar 118<sup>A</sup>, which has a hook 119, which can be moved into and out of engagement with wheel 84. A similar arrangement permits either one of the gears in group 120 of the gearset 73 to be locked to its shaft.

In Fig. 13 I have shown a detail view which illustrates the manner in which the flexible shaft is connected to the worm 83.

The worm has a square plug 83ᴬ, with which the socket 121 cooperates. A snap catch comprising balls 122, which are acted upon by the spring 123, serves to hold the socket 121 onto the plug 83ᴬ.

It will be seen from the above that I have produced a lathe that is provided with adjustments which permit it to be tilted into a vertical position with either the head stock down or with the tail stock down. This enables the operator to cement the lathe into a drill press. The rotatable cross feed table operated by an automatic feed permits the lathe to be used as a milling machine or as a grinder. The machine as constructed in accordance with this invention is also suitable for die sinking as well as for many other uses.

Having now described my invention, what I claim as new is:

1. A lathe comprising, in combination, a vertical support, a sleeve slidably attached thereto, means for moving said sleeve along said support, means for clamping the sleeve to the support in adjusted position, a lathe bed support pivotally attached to the upper end of said sleeve, means for rotating said lathe bed support about its pivot, a lathe bed slidably connected to the lathe bed support, and means for moving said bed in said support.

2. A lathe comprising, in combination, a vertical support, a sleeve slidably attached thereto, means comprising a screw for moving said sleeve along said support, means for clamping said sleeve in adjusted position, a lathe bed support pivotally attached to the upper end of the sleeve, means comprising a worm gear for rotating said lathe bed support on its pivot, a lathe bed slidably attached to said lathe bed support, means comprising a screw for moving the lathe bed in the lathe bed support, and means for clamping said bed in adjusted position.

3. A lathe comprising, in combination, a support, a lathe bed slidably secured to the support, a headstock secured to one end of said lathe bed, a spindle rotatably mounted in the headstock, means for moving said spindle longitudinally, a cross feed table mounted on said lathe bed, means for raising said table with respect to the bed, and means for permitting the cross feed table to be rotated about a transverse axis.

4. A lathe comprising a base, a vertical cylindrical support extending upwardly from said base, a sleeve slidably mounted on the support, said sleeve having an elongated slot through one side, ears on each side of said slot, bolts through said ears, a bracket extending outwardly from said sleeve, a screw having one end resting on the base, a rotatable nut on said screw, means for rotating the nut so as to raise the sleeve on the support, the upper end of said sleeve having a transverse bearing, a lathe bed support pivotally connected to the upper end of the sleeve, a lathe bed slidable in said last-named support, a bracket attached to the last-named support, a shaft rotatably mounted in said bracket, said shaft being co-axial with the pivot, and means comprising a worm gear for tilting said lathe bed about its pivot.

In testimony whereof I affix my signature.

HARVEY J. WARNER.